United States Patent
Tanaka

(10) Patent No.: US 8,255,122 B2
(45) Date of Patent: Aug. 28, 2012

(54) VEHICLE BEHAVIOR CONTROL APPARATUS

(75) Inventor: Kuniyoshi Tanaka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 815 days.

(21) Appl. No.: 12/255,164

(22) Filed: Oct. 21, 2008

(65) Prior Publication Data
US 2009/0118906 A1    May 7, 2009

(30) Foreign Application Priority Data
Oct. 30, 2007    (JP) .................................. 2007-281127

(51) Int. Cl.
*G05D 3/00* (2006.01)
(52) U.S. Cl. ............................................ 701/48; 701/41
(58) Field of Classification Search ................ 701/1, 36, 701/37, 41, 48, 71, 82, 89; 180/443, 445
See application file for complete search history.

(56) References Cited

U.S. PATENT DOCUMENTS

| | | | | |
|---|---|---|---|---|
| 5,335,979 A * | 8/1994 | Naitou et al. | ................. | 303/191 |
| 5,446,657 A * | 8/1995 | Ikeda et al. | ..................... | 701/41 |
| 5,482,133 A * | 1/1996 | Iwata et al. | ..................... | 180/197 |
| 5,711,025 A | 1/1998 | Eckert et al. | | |
| 5,752,752 A * | 5/1998 | Tozu et al. | ..................... | 303/146 |
| 5,762,406 A * | 6/1998 | Yasui et al. | ..................... | 303/146 |
| 5,774,821 A * | 6/1998 | Eckert | ............................ | 701/78 |
| 5,799,745 A * | 9/1998 | Fukatani | ....................... | 180/410 |
| 5,862,503 A * | 1/1999 | Eckert et al. | ..................... | 701/78 |
| 5,869,943 A * | 2/1999 | Nakashima et al. | ......... | 318/586 |
| 6,415,215 B1 * | 7/2002 | Nishizaki et al. | .............. | 701/70 |
| 6,577,334 B1 * | 6/2003 | Kawai et al. | .................. | 348/148 |
| 6,654,674 B2 * | 11/2003 | Lu et al. | ......................... | 701/36 |
| 6,892,123 B2 * | 5/2005 | Hac | ............................. | 701/48 |
| 6,963,797 B2 * | 11/2005 | Salib et al. | ...................... | 701/45 |
| 6,971,275 B2 * | 12/2005 | Nitta | .............................. | 74/335 |
| 7,004,278 B2 * | 2/2006 | Sugitani et al. | ............... | 180/402 |
| 7,027,902 B2 * | 4/2006 | Lu et al. | ......................... | 701/36 |
| 7,136,730 B2 * | 11/2006 | Lu et al. | ......................... | 701/36 |
| 7,171,296 B2 | 1/2007 | Kato et al. | | |
| 7,239,949 B2 * | 7/2007 | Lu et al. | ......................... | 701/45 |
| 7,274,982 B1 * | 9/2007 | Ohkubo et al. | ................. | 701/41 |
| 2002/0087247 A1 * | 7/2002 | Tanaka et al. | .................. | 701/70 |
| 2004/0158377 A1 | 8/2004 | Matsumoto et al. | | |
| 2004/0199316 A1 * | 10/2004 | Kato et al. | ...................... | 701/41 |
| 2005/0125122 A1 * | 6/2005 | Knoop et al. | .................. | 701/36 |
| 2005/0125131 A1 * | 6/2005 | Kato et al. | ...................... | 701/70 |
| 2005/0154506 A1 * | 7/2005 | Takamatsu | ........................ | 701/1 |
| 2005/0209751 A1 * | 9/2005 | Kato | ................................ | 701/41 |

(Continued)

FOREIGN PATENT DOCUMENTS
JP    04-185562    7/1992
(Continued)

*Primary Examiner* — Darnell Jayne
*Assistant Examiner* — Sasha T Varghese
(74) *Attorney, Agent, or Firm* — Rankin, Hill & Clark LLP

(57) ABSTRACT

In an electronic control unit including a master integrated ECU and a slave VSA ECU, the VSA ECU is provided with a request restriction unit which receives a request of the integrated ECU. The request restriction unit prohibits the use of the request and prioritizes the control of the VSA ECU when a direction of vehicle behavior controlled by the request of the integrated ECU and a direction of the vehicle behavior controlled by the VSA ECU itself are different.

12 Claims, 4 Drawing Sheets

U.S. PATENT DOCUMENTS

| | | |
|---|---|---|
| 2005/0228564 A1* | 10/2005 | Kato et al. .................... 701/41 |
| 2006/0015231 A1* | 1/2006 | Yoshimura et al. ............ 701/48 |
| 2006/0190150 A1* | 8/2006 | Milot ............................. 701/38 |
| 2006/0287790 A1* | 12/2006 | Seifert et al. .................. 701/37 |
| 2007/0076593 A1* | 4/2007 | Sakurai et al. ............... 370/219 |

FOREIGN PATENT DOCUMENTS

| | | |
|---|---|---|
| JP | 2000-503611 | 3/2000 |
| JP | 2004-243787 | 9/2004 |
| JP | 2005-112007 | 4/2005 |

* cited by examiner

VEHICLE BEHAVIOR CONTROL APPARATUS

CROSS REFERENCE TO RELATED APPLICATIONS

This application claims the foreign priority benefit under 35 U.S.C. §119 of Japanese Patent Application No. 2007-281127 filed on Oct. 30, 2007, the disclosure of which is incorporated herein by reference.

BACKGROUND OF THE INVENTION

1. Field of the Invention

The present invention relates to a vehicle behavior control apparatus that integrally controls vehicle behavior.

2. Description of the Related Art

Conventionally, a technique using a master-slave control method has been developed for integrally controlling vehicle behavior. The master-slave control method includes a master that transmits a control quantity of vehicle behavior and one or a plurality of slaves that controls actuators associated with the control quantity in accordance with the control quantity. The slaves operate in accordance with the request from the master.

The technique disclosed in Unexamined Japanese Patent Publication No. 2005-112007 also incorporates a master-slave control method. Unexamined Japanese Patent Publication No. 2005-112007 discloses an integrated control apparatus for a vehicle that controls actuators of a steering system, a brake system, and a drive system, in an optimally distributed condition according to the behavioral condition of the vehicle and the state of a road surface without use of the friction coefficient of the road surface, to thereby enhance vehicle stability.

Integrated controls of vehicle behavior using a conventional master-slave control method, such as the one disclosed in Unexamined Japanese Patent Publication No. 2005-112007, however, may cause to destabilize a vehicular running condition because a slave operates according to the request of a master. For example, when oversteer is generated as a vehicle behavior, wherein a vehicle is skidding toward an inner side of turning due to skidding of the rear wheels of the turning vehicle, a slave autonomously controls, for example, to brake the outer front wheel to eliminate oversteer, however, the master may request, to the slave, a control that increases the oversteer in consideration of the balance between the control of the slave and controls of the other slaves. In this case, the slave operates according to the request of the master and causes to destabilize vehicular running condition without eliminating the oversteer. Similarly, when understeer is generated, wherein a vehicle is skidding toward an outer side of turning due to skidding of the front wheels of the turning vehicle, the slave autonomously controls, for example, to brake the inner front wheel to eliminate the understeer, however, the master may request, to the slave, a control that increases the understeer in consideration of the balance between the control of the slave and controls of the other slaves. In this case, the slave operates according to the request of the master and causes to destabilize vehicular running condition without eliminating the understeer. As described above, conventional master-slave control methods have the problem that a slave operates according to the request of a master regardless of vehicular running condition. Unexamined Japanese Patent Publication No. 2005-112007 does not mention this problem.

SUMMARY OF THE INVENTION

The present invention is made in view of the above problem, and an object thereof is to perform controls that are appropriate for stabilizing vehicular running condition in an integrated vehicle behavior control.

A first aspect of the present invention provides a vehicle behavior control apparatus including a plurality of vehicle behavior control units for controlling vehicle behavior; and an integrated control unit which outputs a request to the plurality of vehicle control units and integrally controls the plurality of vehicle control units. The plurality of vehicle control units controlling the vehicle behavior based on their own requests and the request from the integrated control unit. If a direction of the vehicle behavior controlled by the request from at least one of the plurality of vehicle control units is different from a direction of the vehicle behavior controlled by the request of the integrated control unit, the at least one of the plurality of vehicle control units restricts the request of the integrated control unit.

Other features and advantages of the present invention will become more apparent from the following detailed descriptions of the invention when taken in conjunction with the accompanying drawings.

DETAILED DESCRIPTION OF THE INVENTION

The best mode for implementing a vehicle behavior control apparatus of the present invention (hereinafter referred to as an "embodiment") is described below. The embodiment is explained with reference to the accompanying drawings as appropriate.

Figure 1:
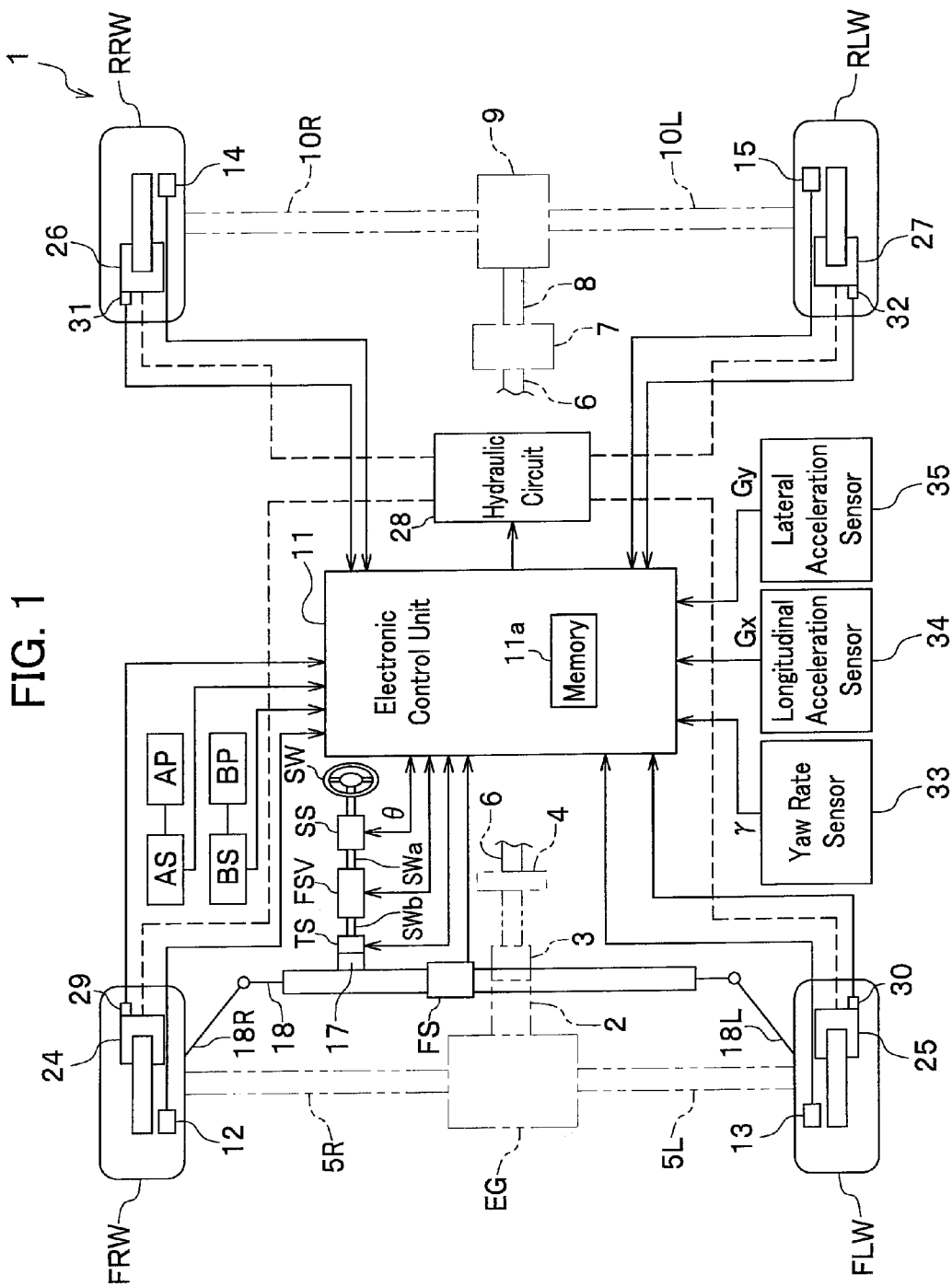
FIG. 1 is a schematic and configurational block diagram of a vehicle according to an embodiment of the present invention.

FIG. 1 is a schematic and configurational block diagram of a vehicle 1 according to an embodiment of the present invention. Referring to FIG. 1, a drive system, a steering system and a brake system of the vehicle 1 are explained.

<Drive System>

First, the drive system of a vehicle 1 will be described. As shown in FIG. 1, a center differential 4 is connected to an engine EG of the vehicle 1 via a torque converter 2 and a transmission 3. Front axles 5R and 5L are connected to the center differential 4 via an unillustrated front propeller shaft and an unillustrated front differential. A front right wheel FRW is attached to the front axle 5R, and a front left wheel FLW is attached to the front axle 5L. A drive force distribution unit 7, which serves as drive force distribution device, is connected to the center differential 4 via a rear propeller shaft 6. While the drive force distribution unit 7 is connected to the rear propeller shaft 6, a rear differential 9 is connected to the drive force distribution unit 7 via a drive pinion shaft 8. A rear right wheel RRW and a rear left wheel RLW are connected to the rear differential 9 via a pair of rear axles 10R and 10L, respectively.

The drive force of the engine EG is transmitted to the center differential 4 via the torque converter 2 and the transmission 3 and further to the front right wheel FRW and the front left wheel FLW via the unillustrated front propeller shaft, the unillustrated front differential, and the front axles 5R and 5L. In the case where the rear propeller shaft 6 and the drive pinion shaft 8 are torque-transmittably connected together by means of the drive force distribution unit 7, the drive force of the engine EG is transmitted to the rear right wheel RRW and the rear left wheel RLW via the rear propeller shaft 6, the drive pinion shaft 8, the rear differential 9, and the rear axles 10R and 10L.

The drive force distribution unit 7 includes an unillustrated known electromagnetic clutch mechanism of a wet multiple-disc type. The electromagnetic clutch mechanism has a plurality of clutch discs, which are frictionally engaged with each other or are disengaged from each other. When current corresponding to a control instruction value is supplied to an electromagnetic solenoid (not shown), which serves as an actuator, contained in the electromagnetic clutch mechanism, the clutch discs are frictionally engaged with each other, whereby torque is transmitted to the rear right wheel RRW and the rear left wheel RLW.

The frictional engagement force between the clutch discs varies depending on the quantity of current (intensity of current) supplied to the electromagnetic solenoid. By controlling the quantity of current supplied to the electromagnetic solenoid, the transmission torque between the front right and left wheels FRW and FLW and the rear right and left wheels RRW and RLW; i.e., the restraint force therebetween, can be adjusted. As the frictional engagement force between the clutch discs increases, the transmission torque between the front wheels and the rear wheels increases. By contrast, as the frictional engagement force between the clutch discs decreases, the transmission torque between the front wheels and the rear wheels decreases. The electronic control unit 11 controls supply and shutoff of current supplied to the electromagnetic solenoid and adjustment of the quantity of the current. When supply of current to the electromagnetic solenoid is shut off, the clutch discs are disengaged from each other, thereby shutting off transmission of torque to the rear wheels (rear right wheel RRW and rear left wheel RLW). In this manner, the electronic control unit 11 controls the frictional engagement force between the clutch discs in the drive force distribution unit 7, to thereby select a 4-wheel drive mode or a 2-wheel drive mode. Also, in the 4-wheel drive mode, the electronic control unit 11 controls the drive force distribution ratio (torque distribution ratio) between the front wheels and the rear wheels. In the present embodiment, the drive force distribution rate between the front wheels and the rear wheels can be adjusted in the range from 100:0 to 50:50.

The vehicle 1 has an accelerator pedal AP. An accelerator sensor AS inputs a detection signal corresponding to a pedal stroke amount of the accelerator pedal AP to the electronic control unit 11 mounted on the vehicle 1. In accordance with the detection signal, the electronic control unit 11 controls the throttle opening of the engine EG. As a result, the output of the engine EG is controlled in accordance with the pedal stroke amount of the accelerator pedal AP. The accelerator sensor AS corresponds to device for detecting throttle opening (driving-operation quantity). Wheel speed sensors 12 to 15 for detecting the rotational speed (wheel speed) of the corresponding wheels are provided respectively on the front right wheel FRW, the front left wheel FLW, the rear right wheel RRW, and the rear left wheel RLW. Detection signals (wheel speeds Vfr, Vfl, Vrr, and Vrl) from the corresponding wheel speed sensors 12 to 15 are output to the electronic control unit 11.

<Steering System>

Next, the steering system of the vehicle 1 will be described. The steering system includes a steering wheel SW, a first shaft SWa, a second shaft SWb, a rack 18, a steering angle sensor SS, a steering torque sensor TS, an IFS actuator FSV, and an EPS actuator FS. One end of the first shaft SWa is connected to the steering wheel SW, and the other end of the first shaft SWa is connected to the input side of the IFS actuator FSV. The steering wheel SW corresponds to driving-operation device.

The IFS actuator FSV includes an electric motor, and a speed reducer composed of a plurality of gears. One end of the second shaft SWb is connected to the output side of the IFS actuator FSV, and the other end of the second shaft SWb is connected to the input side of a steering gear box 17. The steering gear box 17 converts a rotational motion, which is input from the second shaft SWb, into an axial motion of the rack 18 by device of the rack 18 and a pinion gear (not shown). The axial motion of the rack 18; i.e., a reciprocating motion, is transmitted to the front left wheel FLW and the front right wheel FRW via left and right tie rods 18L and 18R, thereby steering the front wheels. By virtue of the above configuration, the IFS actuator FSV changes the ratio of an output gear to an input gear in real time in accordance with a vehicle speed V and varies the ratio of the output angle of the second shaft SWb to the steering angle of the first shaft SWa, by device of the above-mentioned electric motor and speed reducer (not shown). The IFS actuator FSV serves as a transmission-ratio-varying device.

Notably, IFS is an acronym for Intelligent Front Steer where vehicle behavioral quantities, such as yaw rate and vehicle-body slip angle, are detected and are fed back to steering of steerable wheels (front wheels) in order to enhance drivability and safety of a vehicle. Control of IFS is usually called "IFS control".

The steering angle sensor SS detects the rotational angle (steering angle $\theta$) of the first shaft SWa and inputs a steering angle signal indicative of the detected angle to the electronic control unit 11. The EPS actuator FS has an electric motor arranged coaxially with the rack 18. Under control of the electronic control unit 11, the EPS actuator FS generates an assist force in accordance with the state of steering and provides the assist force to the rack 18. In other words, the EPS actuator FS functions as a steering actuator for assisting steering. The electronic control unit 11 has a variable-transmission-ratio control function that causes the IFS actuator FSV to vary the steering gear ratio in accordance with the speed of a vehicle (vehicle speed), as well as a steering control function that causes the EPS actuator FS to generate an assist force in accordance with the state of steering, thereby assisting steering.

<Brake System>

Next, the brake system of the vehicle 1 will be described. The brake system includes wheel cylinders 24 to 27, which serve as braking device and are provided respectively for the front right wheel FRW, the front left wheel FLW, the rear right wheel RRW, and the rear left wheel RLW; a hydraulic circuit 28; an unillustrated master cylinder; and a brake pedal BP for driving the master cylinder. The hydraulic circuit 28 includes a reservoir, an oil pump, and various valve devices. The brake fluid pressures of the wheel cylinders 24 to 27 are usually controlled via the hydraulic circuit 28 by the brake fluid pressure of the master cylinder, which is driven in accordance with the pedal stroke amount of the brake pedal BP. The brake fluid pressure of each of the wheel cylinders 24 to 27 exerts a braking force on the corresponding wheel.

In a predetermined control operation, such as antilock braking control, the electronic control unit 11 controls solenoid valves (unillustrated) of the hydraulic circuit 28 on the basis of various control parameters, which will be described later, to thereby individually control the brake fluid pressures of the wheel cylinders 24 to 27; for example, to increase, decrease, or hold the brake fluid pressures. A brake pedal stroke amount sensor BS inputs, to the electronic control unit 11, a signal corresponding to the pedal stroke amount when the brake pedal BP is stepped on. The electronic control unit 11 detects, from the signal, the pedal stroke amount of the brake pedal BP. The solenoid valves correspond to actuators in the control system.

Fluid pressure sensors 29 to 32 detect the brake fluid pressures of the corresponding wheel cylinders 24 to 27 and input detection signals indicative of the detected brake fluid pressures to the electronic control unit 11. The electronic control unit 11 detects, from the detection signals, the braking conditions of the front right wheel FRW, the front left wheel FLW, the rear right wheel RRW, and the rear left wheel RLW.

<Control System>

Next, the control system of the vehicle 1 will be described.

The electronic control unit 11 includes a digital computer. The electronic control unit 11 may include a single ECU (electronic control unit) or a plurality of ECUs corresponding to controls to be performed. The embodiment includes at least a master ECU and a plurality of slave ECUs. The ECU includes a CPU and a memory 11a, which includes ROM and RAM. The electronic control unit 11 stores in the memory 11a detection signals mentioned below and associated with behavioral conditions of the vehicle 1, as control parameters. On the basis of the control parameters, the electronic control unit 11 integrally controls the steering system, the drive system, and the brake system of the vehicle 1, to thereby stabilize the running posture of the vehicle 1; i.e., to enhance vehicle stability. The electronic control unit 11 corresponds to control device.

<Outline of Engine Control>

A detection signal indicative of the pedal stroke amount of the accelerator pedal AP is input to the electronic control unit 11 from the accelerator sensor AS. On the basis of the pedal stroke amount of the accelerator pedal AP, the electronic control unit 11 calculates the throttle opening of the engine EG and outputs a control signal indicative of the throttle opening to the engine EG, to thereby control the engine EG. The calculated throttle opening is stored in the memory 11a.

<Calculation of Vehicle Speed>

Detection signals indicative of the wheel speeds Vfr, Vfl, Vrr, and Vrl of the front right wheel FRW, the front left wheel FLW, the rear right wheel RRW, and the rear left wheel RLW, respectively, are input to the electronic control unit 11 from the wheel speed sensors 12 to 15. On the basis of the input detection signals, the electronic control unit 11 calculates the wheel speeds of the front right wheel FRW, the front left wheel FLW, the rear right wheel RRW, and the rear left wheel RLW and stores the calculated values in the memory 11a as control parameters. On the basis of the calculation results, the electronic control unit 11 calculates the vehicle speed V of the vehicle 1 and stores the calculated value in the memory 11a as a parameter. In the present embodiment, the average of the wheel speeds Vfr, Vfl, Vrr, and Vrl is calculated and taken as the vehicle speed V (=(Vfr+Vfl+Vrr+Vrl)/4). In the above embodiment, the electronic control unit 11 corresponds to vehicle behavioral-quantity detection device for detecting the vehicle speed V.

<Control of EPS Actuator FS>

A steering angle signal, which is a detection signal indicative of the steering angle θ of the steering wheel SW, is input to the electronic control unit 11 from the steering angle sensor SS. Also, a detection signal indicative of a steering torque Tstr is input to the electronic control unit 11 from the steering torque sensor TS. On the basis of the detection signals, the electronic control unit 11 calculates the steering angle θ and the steering torque and stores the calculated values in the memory 11a. On the basis of the steering torque and the above-mentioned vehicle speed V, the electronic control unit 11 calculates an assist instruction value. On the basis of the calculated assist instruction value, the electronic control unit 11 assistively controls the EPS actuator FS.

<Control of IFS Actuator FSV>

The electronic control unit 11 determines an angle control quantity corresponding to a target rotational angle of the electric motor of the IFS actuator FSV from an unillustrated vehicle-speed-vs.-steering-gear-ratio map based on the steering angle θ and the vehicle speed V that are obtained as described above. The unillustrated vehicle-speed-vs.-steering-gear-ratio map includes angle control quantities, each of which corresponds to a target rotational angle of the electric motor of the IFS actuator FSV that is uniquely specified in relation to the steering angle θ and the vehicle speed V. The electronic control unit 11 feeds a motor voltage corresponding to the determined angle control quantity to an ECU that controls steering (see FIG. 4) via unillustrated amplification device. The vehicle-speed-vs.-steering-gear-ratio map is prepared such that a steering gear ratio N increases with the vehicle speed V; i.e., such that, as the vehicle speed V increases, the steering gear ratio N increases.

Thus, the steering gear ratio N can be set in relation to the vehicle speed V, for example, in such a manner that relative to a given steering angle θ of the steering wheel SW, the output angle of the IFS actuator FSV becomes larger when the vehicle is halted or is running at lower speed, or becomes smaller when the vehicle is running at higher speed.

The steering quantity of the front right wheel FRW and the front left wheel FLW; i.e., the steering angle (actual steering angle δ) of the front wheels (wheels to be steered), is proportional to the above-mentioned output angle. As a result, for example, in the case where the vehicle is halted or is running at lower speed, the steering gear ratio N in the IFS actuator FSV is set lower; thus, even when the steering angle of the steering wheel SW is smaller, the front wheels are steered to a great extent, thereby facilitating the driver's steering. In the case where the vehicle is running at higher speed, the steering gear ratio N in the IFS actuator FSV is set higher; thus, even when the steering angle of the steering wheel SW is greater, the wheels are steered to a smaller extent, thereby ensuring stability of vehicle behavior. On the basis of the steering gear ratio N, the electronic control unit 11 calculates the actual steering angle δ (=θ/N), which is an actual steering angle of the front wheels, from the above-mentioned steering angle θ. The steering gear ratio N is the ratio of the actual steering angle δ to the steering angle θ of the steering wheel SW and is obtained on the basis of the aforementioned map. Therefore, the actual steering angle δ is calculated on the basis of the map. Notably, the actual steering angle δ may be calculated as follows: an output angle sensor is provided for detecting the rotational angle of the second shaft SWb, and the actual steering angle δ is calculated on the basis of a detection signal from the output angle sensor. The electronic control unit 11 corresponds to a variable-transmission-ratio control device. The electronic control unit 11, which calculates the actual steering angle δ, corresponds to the vehicle behavioral-quantity detection device.

<Braking Control>

The electronic control unit 11A receives a detection signal indicative of the pedal stroke amount of the brake pedal BP from the brake pedal stroke amount sensor BS. On the basis of the received detection signal, the electronic control unit 11 calculates a pedal stroke amount. In execution of predetermined control, such as antilock braking control, on the basis of the calculated pedal stroke amount, the electronic control unit 11 calculates required brake fluid pressures for the wheel cylinders 24 to 27 and outputs control quantities for generating the required brake fluid pressures to corresponding drive circuit sections (not shown) of the hydraulic circuit 28 for driving the corresponding solenoid valves. The electronic control unit 11 also receives a detection signals indicative of brake fluid pressures of the wheel cylinders 24 to 27 from the fluid pressure sensors 29 to 32. On the basis of the received detection signals, the electronic control unit 11 calculates the brake fluid pressures of the wheel cylinders 24 to 27 and stores the calculated values in the memory 11a as control parameters. The electronic control unit 11 performs feedback control by using detected brake fluid pressures as feedback quantities.

As shown in FIG. 1, the vehicle 1 has a yaw rate sensor 33, a longitudinal acceleration sensor 34, and a lateral acceleration sensor 35. The yaw rate sensor 33 inputs a detection signal indicative of an actual yaw rate γ, which is an actual yaw rate of the vehicle 1, to the electronic control unit 11. On the basis of the detection signal, the electronic control unit 11 calculates the actual yaw rate γ and stores the calculated value in the memory 11a as a control parameter. The longitudinal acceleration sensor 34 inputs a detection signal indicative of an actual longitudinal acceleration Gx, which is an actual longitudinal acceleration of the vehicle 1, to the electronic control unit 11. On the basis of the detection signal, the electronic control unit 11 calculates the actual longitudinal acceleration Gx and stores the calculated value in the memory 11a as a control parameter. The lateral acceleration sensor 35 inputs a detection signal indicative of an actual lateral acceleration Gy, which is an actual lateral acceleration of the vehicle 1, to the electronic control unit 11. On the basis of the received detection signal, the electronic control unit 11 calculates the actual lateral acceleration Gy and stores the calculated value in the memory 11a as a control parameter.

The yaw rate sensor 33 corresponds to vehicle behavioral-quantity detection device for detecting the actual yaw rate γ.

<Electronic Control Unit>

Figure 2:
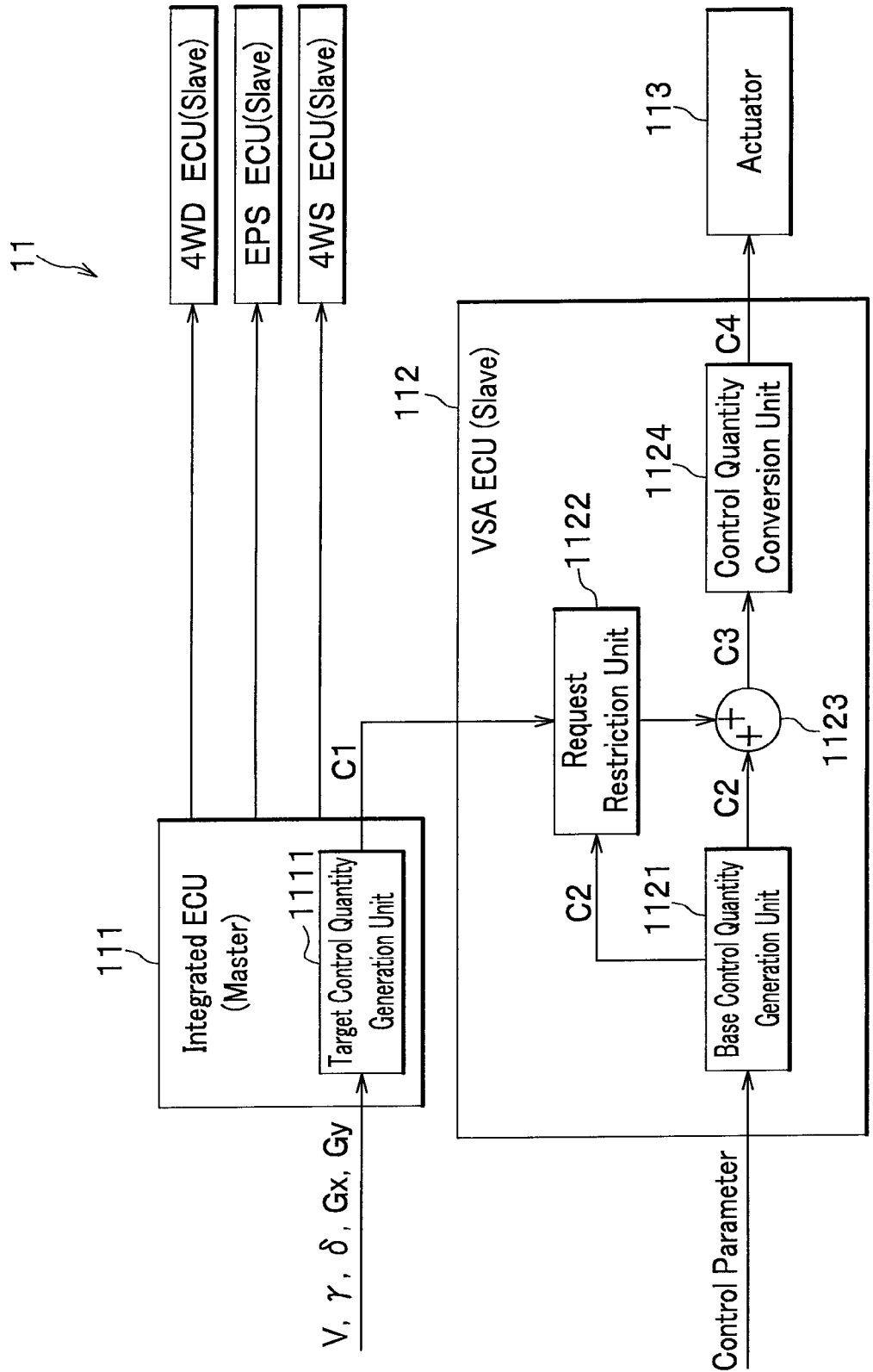
FIG. 2 is a block diagram showing control configuration of an electronic control unit.

An electronic control unit 11 provided for the vehicle 1 according to the embodiment is described in detail below. FIG. 2 is a block diagram that shows a control configuration of the electronic control unit 11. The electronic control unit 11 includes an integrated ECU 111 that functions as a master, and a VSA ECU 112 that functions as a slave and performs a control by VSA (Vehicle Stability Assist). The VSA ECU 112 autonomously controls the braking actuators 113 by VSA (Vehicle Stability Assist). The integrated ECU 111 calculates a target control quantity and transmits the target control quantity to the VSA ECU 112 to request the VSA ECU 112 to change the control of the braking actuators 113 by VSA.

The electronic control unit 11 includes not only the VSA ECU 112 but also an engine ECU that controls the engine, an IFS ECU that controls IFS actuator FSV and an EPS ECU that controls EPS actuator FS, all of which function as slaves. The integrated ECU 111 also calculates target control quantities for each of the ECUs and transmits the target control quantities to the corresponding ECUs to integrally control the plurality of ECUs that functions as slaves. As for the ECUs functioning as slaves, the VSA ECU is explained as an example hereinafter.

The integrated ECU 111 includes a target control quantity generation unit 1111. When the target control quantity generation unit 1111 receives a physical quantity representing a behavior state of the vehicle 1, the target control quantity generation unit 1111 calculates a target control quantity C1, which is used for an output request for the VSA ECU 112, by use of known calculation methods. The target control quantity generation unit 1111 then transmits the target control quantity C1 to the VSA ECU 112. The physical quantity representing a behavior state of the vehicle 1 includes the actual yaw rate γ detected by the yaw rate sensor 33, the actual longitudinal acceleration Gx detected by the longitudinal acceleration sensor 34, the actual lateral acceleration Gy detected by the lateral acceleration sensor 35, the vehicle speed V detected by the wheel speed sensors 12 to 15, and the actual steering angle δ that is obtained from the vehicle-speed-vs.-steering-gear-ratio map.

The target control quantity generation unit 1111 calculates a target yaw rate γ* (hereinafter, a target yaw rate is denoted by γ*) for obtaining a target control quantity C1 on the basis of the vehicle speed V and the actual steering angle δ by use of the known fundamental equation of motions of a vehicle. The target control quantity generation unit 1111 then calculates a yaw rate difference Δγ between the actual yaw rate γ and the target yaw rate γ* and uses the calculated yaw rate difference Δγ as the target control quantity C1.

Furthermore, when calculating a target skid angle β* (hereinafter, a target skid angle is denoted by β*) for obtaining the target control quantity C1, the target control quantity generation unit 1111 calculates the target skid angle β* on the basis of the vehicle speed V and the actual steering angle δ by use of the known fundamental equation of motion of a vehicle. The target control quantity generation unit 1111 then calculates a skid angle difference Δβ between the actual skid angle β and the target skid angle β* and uses the calculated skid angle difference Δβ as the target control quantity C1.

The VSA ECU 112 includes a base control quantity generation unit 1121, a request restriction unit 1122, an adder 1123, and a control quantity conversion unit 1124. When control parameters are input to the base control quantity generation unit 1121, the base control quantity generation unit 1121 performs a known calculation process by use of a predetermined map or the like to generate a base control quantity C2, which is a control quantity required to autonomously stabilize the behavior of the vehicle 1 by the VSA ECU 112 itself. The control parameters include control parameters related to the braking system. Examples of the control parameters of the braking system include the vehicle speed V, the wheel speeds Vfr, Vfl, Vrr, and Vrl, and a pedal stroke amount detected by the brake pedal stroke amount sensor BS. The generated base control quantity C2 is then output to the request restriction unit 1122 and the adder 1123.

The request restriction unit 1122 determines whether or not the VSA ECU 112 follows an output request from the integrated ECU 111. When the request restriction unit 1122 receives the target control quantity C1 that is generated by the target control quantity generation unit 1111 and the base control quantity C2 that is generated by the base control quantity generation unit 1121, the request restriction unit 1122 determines whether or not the output request from the integrated ECU 111 that is specified by the target control quantity C1 contradicts the control of the VSA ECU 112 that is specified by the base control quantity C2.

The contradiction means that the direction in which the vehicle behavior is controlled by the target control quantity C1 is different from the direction in which the vehicle behavior is controlled by the base control quantity C2. A case in which the vehicle 1 is oversteering wherein the vehicle 1 corners more than the control of the steering wheel SW (i.e. $|\gamma^*|<|\gamma|$) is explained as an example. In this case, the base control quantity C2 is a control amount that brakes a front outer wheel to generate an outward moment so that the cornering force generated at the front side of the vehicle 1 can be reduced. However, the target control quantity C1 may be a control quantity that increases the cornering force by, for example, driving the front outer wheel. In this case, the oversteer is further increased, which destabilizes the vehicle 1. When the output request from the integrated ECU 111 contradicts the control of the VSA ECU 112 itself, the request restriction unit 1122 does not output the target control quantity C1 to the adder 1123 to prohibit the use of the output request. When there is no contradiction (i.e. when the direction in which the vehicle behavior is controlled by the target control quantity C1 is not different from the direction in which the vehicle behavior is controlled by the base control quantity C2), the request restriction unit 1122 allows the use of the output request from the integrated ECU 111 and outputs the target control quantity C1 to the adder 1123.

The adder 1123 adds the target control quantity C1 output from the request restriction unit 1122 to the base control quantity C2 output from the base control quantity generation unit 1121 when the request restriction unit 1122 allows the use of the output request from the integrated ECU 111. The adder 1123 sets the added control quantity of the base control quantity C2 and the target control quantity C1 to be an instruction control quantity C3, and outputs the instruction control quantity C3 to the control quantity conversion unit 1124. When the request restriction unit 1122 prohibits the use of the output request from the integrated ECU 111, the base control quantity C2 itself is set to be the instruction control quantity C3, and the instruction control quantity C3 is output to the control quantity conversion unit 1124.

The control quantity conversion unit 1124 converts the instruction control quantity C3 that is output from the adder 1123 to a physical quantity that corresponds to the quantity specified by the instruction control quantity C3 and is required to drive the actuator 113. The control quantity conversion unit 1124 outputs the converted quantity to the corresponding actuator 113 as a converted control quantity C4.

When the VSA ECU 112 controls the braking system for example, the control quantity conversion unit 1124 supplies liquid pressures corresponding to the instruction control quantity C3 to an oil-hydraulic circuit 28 as the converted control quantity C4 and controls electromagnetic valves, which are the actuators 113 of the oil-hydraulic circuit 28, to control a brake fluid pressure in each wheel cylinder 24 to 27. The wheel cylinders 24 to 27 press brake shoes to brake each wheel in accordance with the instruction control quantity C3.

<Control Operation>

Figure 3:
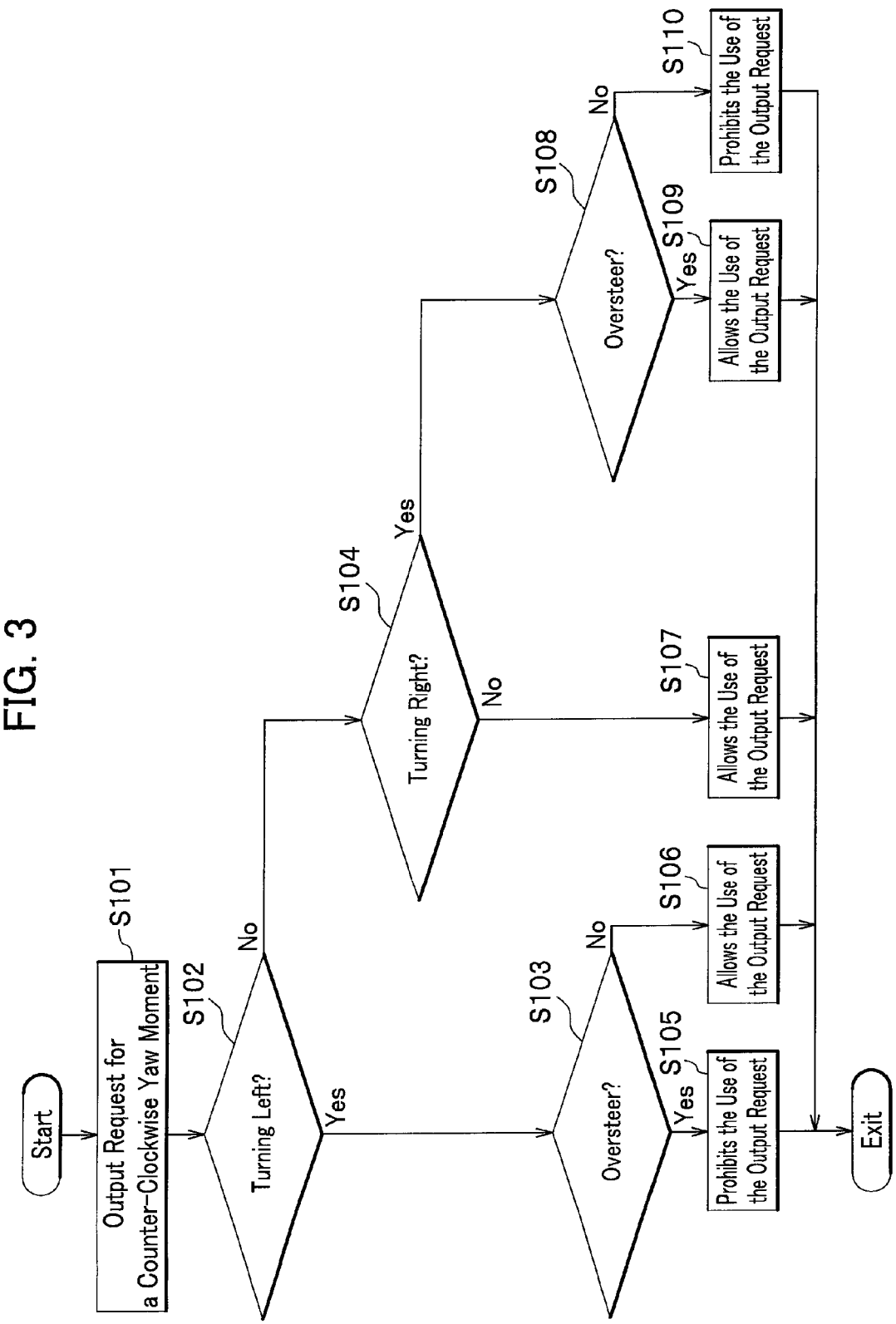
FIG. 3 is a control flow chart of a process executed when a master integrated ECU requests a slave VSA ECU to generate a counter-clockwise yaw moment.
Figure 4:
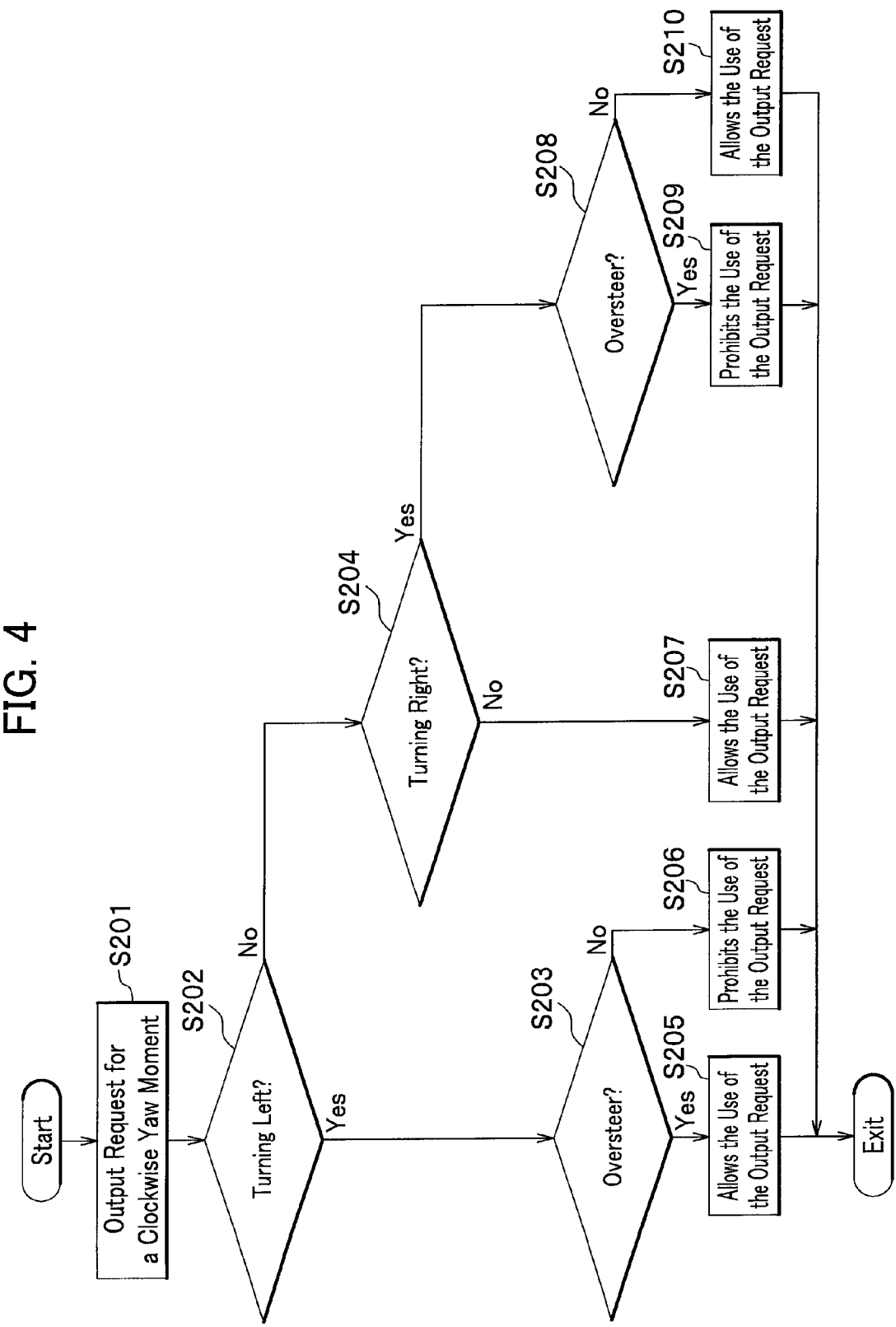
FIG. 4 is a control flow chart of a process executed when the master integrated ECU requests the slave VSA ECU to generate a clockwise yaw moment.

A control operation that is executed by the electronic control unit 11 according to the embodiment is described below. As an example of the control operation, the operation executed by a master-slave control method when the vehicle 1 is oversteer or understeer during turning is explained. FIG. 3 is a control flow chart of a process executed when the integrated ECU 111, which is a master, requests the VSA ECU 112, which is a slave, to generate a counter-clockwise yaw moment. FIG. 4 is a control flow chart of a process executed when the integrated ECU 111, which is a master, requests the VSA ECU 112, which is a slave, to generate a clockwise yaw moment.

In FIG. 3, the integrated ECU 111 requests the VSA ECU 112 to generate a counter-clockwise yaw moment (Step 101). In Step 101, the integrated ECU 111 calculates the target yaw rate $\gamma^*$ on the basis of the vehicle speed V and the actual steering angle $\delta$, and then calculates the yaw rate difference $\Delta\gamma$ between the actual yaw rate $\gamma$ and the target yaw rate $\gamma^*$ as the target control quantity C1. The integrated ECU 111 then transmits the target control quantity C1 to the VSA ECU 112.

Next, it is determined whether or not the vehicle 1 is turning left (Step 102). This can be determined by the steering angle $\theta$ input to the VSA ECU 112 as a control parameter. If it is determined that the vehicle is turning left (Yes at Step 102), the processing proceeds to Step 103. If it is determined that the vehicle is not turning left (No at Step 102), the processing proceeds to Step 104.

In Step 103, it is determined whether or not the vehicle 1 is in a oversteer state. This can be determined by the actual skid angle $\beta$ input to the VSA ECU 112. If it is determined that the vehicle is in the oversteer state (Yes at Step 103), the use of the output request is prohibited in the request restriction unit 1122 (Step 105) since a counter-clockwise yaw moment that will be generated by the output request increases the oversteer of the vehicle and destabilizes the vehicle. As a result, the target control quantity C1 is not added to the base control quantity C2. If it is determined that the vehicle is not in a oversteer state (No at Step 103), the vehicle 1 is in a understeer state where the vehicle is drifting toward an outer side (right side) of turning while the vehicle is turning left. In this case, the counter-clockwise yaw moment that will be generated by the output request reduces the understeer and contributes to stabilize the vehicle, therefore, the request restriction unit 1122 allows the use of the output request (Step 106). As a result, the target control quantity C1 is added to the base control quantity C2.

In step 104, it is determined whether or not the vehicle 1 is turning right (Step 104). If it is determined that the vehicle is turning right (Yes at Step 104), the processing proceeds to Step 108. If it is determined that the vehicle is not turning right (No at Step 104), the use of the output request is allowed in the request restriction unit 1122 (Step 107) since the counter-clockwise yaw moment that will be generated by the output request does not cause to destabilize the vehicle. As a result, the target control quantity C1 is added to the base control quantity C2.

In Step 108, it is determined whether or not the vehicle 1 is in an oversteer state. If it is determined that the vehicle is in an oversteer state (Yes at Step 108), the use of the output request is allowed in the request restriction unit 1122 (Step 109) since a counter-clockwise yaw moment that will be generated by the output request reduces the oversteer and contributes to stabilize the vehicle. As a result, the target control quantity C1 is added to the base control quantity C2. If it is determined that the vehicle is not in an oversteer state (No at Step 108), the vehicle 1 is in an understeer state where the vehicle is drifting toward an outer side (left side) of turning while the vehicle is turning right. In this case, the counter-clockwise yaw moment that will be generated by the output request increases the understeer and destabilizes the vehicle, therefore, the request restriction unit 1122 prohibits the use of the output request (Step 110). As a result, the target control quantity C1 is not added to the base control quantity C2.

In FIG. 4, the integrated ECU 111 requests the VSA ECU 112 to generate a clockwise yaw moment (Step 201). Similar to the case shown in FIG. 3, the integrated ECU 111 calculates the target control quantity C1, and transmits the target control quantity C1 to the VSA ECU 112.

Next, it is determined whether or not the vehicle 1 is turning left (Step 202). If it is determined that the vehicle 1 is turning left (Yes at Step 202), the processing proceeds to Step 203. If it is determined that the vehicle 1 is not turning left (No at Step 202), the processing proceeds to Step 204.

In Step 203, it is determined whether or not the vehicle 1 is in an oversteer state. If it is determined that the vehicle 1 is in a oversteer state (Yes at Step 203), the request restriction unit 1122 allows the use of the output request (Step 205) since a clockwise yaw moment that will be generated by the output request reduces the oversteer and contributes to stabilize the vehicle 1. As a result, the target control quantity C1 is added to the base control quantity C2. If it is determined that the vehicle 1 is not in oversteer (No at Step 203), the vehicle 1 is in a understeer state where the vehicle 1 is drifting in an outer side (right side) of turning while the vehicle 1 is turning left. In this case, the use of the output request is prohibited in the request restriction unit 1122 (Step 206) since a clockwise yaw moment that will be generated by the output request increases the understeer of the vehicle 1 and causes to destabilize the vehicle 1. As a result, the target control quantity C1 is not added to the base control quantity C2.

In step 204, it is determined whether or not the vehicle 1 is turning right (Step 204). If it is determined that the vehicle 1 is turning right (Yes at Step 204), the processing proceeds to Step 208. If it is determined that the vehicle 1 is not turning right (No at Step 204), the use of the output request is allowed in the request restriction unit 1122 (Step 207) since a clockwise yaw moment that will be generated by the output request does not cause to destabilize the vehicle 1. As a result, the target control quantity C1 is added to the base control quantity C2.

In Step 208, it is determined whether or not the vehicle 1 is in a oversteer state. If it is determined that the vehicle 1 is in a oversteer state (Yes at Step 208), the use of the output request is prohibited in the request restriction unit 1122 (Step 209) since the clockwise yaw moment that will be generated by the output request increases the oversteer and causes to destabilize the vehicle 1. As a result, the target control quantity C1 is not added to the base control quantity C2. If it is determined that the vehicle 1 is not in oversteer (No at Step 208), the vehicle 1 is in a understeer state where the vehicle 1 is drifting in an outer side (left side) of turning while the vehicle 1 turns right. In this case, a clockwise yaw moment that will be generated by the output request reduces the understeer and contributes to stabilize the vehicle 1, therefore, the request restriction unit 1122 allows the use of the output request (Step 210). As a result, the target control quantity C1 is added to the base control quantity C2.

The embodiment has advantages that are described below. The embodiment enables to avoid the case where the running condition of the vehicle 1 is destabilized by a slave following the output request of a master in a master-slave control method that integrally controls vehicle behavior, whereby controls appropriate for stabilizing the running condition of the vehicle 1 can be performed. This is achieved by the request restriction unit 1122 that prohibits the use of the output request of the integrated ECU 111 and prioritizes the control of the VSA ECU 112 when the output request of the master integrated ECU 111 contradicts the control of the slave VSA ECU 112 (i.e. the directions of the controls of the master and the salve are different).

More specifically, the request restriction unit 1122 prohibits the use of the output request of the integrated ECU 111 that increases oversteer when the vehicle 1 is oversteering, which realizes stabilization of vehicular running condition. The request restriction unit 1122 also restricts the use of the output request of the integrated ECU 111 that increases understeer when the vehicle 1 is understeering, whereby stabilization of vehicular running condition is realized.

Also, the request restriction unit 1122 is provided to the slave VSA ECU 112, not to the master integrated ECU 111, which enables to prevent the running condition of the vehicle 1 from being destabilized even when the design of the master device is changed. If the request restriction unit 1122 is provided to the master integrated ECU 111, a restriction generated by the request restriction unit 1122 may be changed by the design change of the master device, which may cause the request restriction unit 1122 to allow the use of the output request of the master device that destabilizes the running condition of the vehicle 1.

The embodiment described above is the best mode for implementing the invention, however, embodiments are not limited to the above embodiment. Various modifications can be made to the embodiment without departing from the spirits of the present invention.

In the embodiment, the request restriction unit 1122 prohibits the use of the output request of the integrated ECU 111 when the output request of the master integrated ECU 111 contradicts the control of the slave VSA ECU 112, however, the request restriction unit 1122 may set the importance values of the output request of the integrated ECU 111 and the control of the VSA ECU 112 and change the ratio of the importance values appropriately to restrict the use of the output request of the master integrated ECU 111.

In the embodiment described above, the slave VSA ECU 112 is explained as an example, however, other slaves (see FIG. 2) such as a 4WD ECU that performs controls of 4WD (Four Wheel Drive), an EPS ECU that performs controls of EPS and a 4WS ECU that performs controls of 4WS (Four Wheel Steering) perform the similar control process as the VSA ECU 112.

The embodiment according to the present invention has been explained as aforementioned. However, the embodiment of the present invention is not limited to those explanations, and those skilled in the art ascertain the essential characteristics of the present invention and can make the various modifications and variations to the present invention to adapt it to various usages and conditions without departing from the spirit and scope of the claims.

What is claimed is:

1. A vehicle behavior control apparatus, comprising:
   a plurality of vehicle control units for determining a moving direction in which vehicle behavior is restrained and controlling the vehicle behavior; and
   an integrated control unit which determines a moving direction in which the vehicle behavior is controlled, outputs a request to the plurality of vehicle control units and integrally controls the plurality of vehicle control units,
   the plurality of vehicle control units controlling the vehicle behavior based on their own requests and the request from the integrated control unit, wherein
   if the moving direction determined by at least one of the plurality of vehicle control units in which the vehicle behavior is restrained is different from the moving direction determined by the integrated control unit in which the vehicle behavior is controlled,
   the at least one of the plurality of vehicle control units restricts the request of the integrated control unit.

2. The vehicle behavior control apparatus according to claim 1, wherein each vehicle control unit is provided with a request restriction unit that restricts the request of the integrated control unit.

3. The vehicle behavior control apparatus according to claim 1, wherein the plurality of vehicle control units includes a Vehicle Stability Assist system, a Four Wheel Drive ECU, an Electric Power Steering ECU, and a Four Wheel Steering ECU.

4. The vehicle behavior control apparatus according to claim 1, wherein during an oversteer state of a vehicle, when a steering wheel has been rotated in a clockwise direction and the integrated control unit has requested that a vehicle stability assist electronic control unit generate a clockwise yaw movement, the request of the integrated control unit is denied.

5. The vehicle behavior control apparatus according to claim 1, wherein during an oversteer state of a vehicle, when a steering wheel has been rotated in a clockwise direction and the integrated control unit has requested that the vehicle stability assist electronic control unit generate a counter-clockwise yaw movement, the request of the integrated control unit is allowed.

6. The vehicle behavior control apparatus according to claim 1, wherein during an oversteer state of the vehicle, when a steering wheel has been rotated in a counter-clockwise direction and the integrated control unit has requested that a vehicle stability assist electronic control unit generate a clockwise yaw movement, the request of the integrated control unit is allowed.

7. A vehicle behavior control apparatus, comprising:
a plurality of vehicle control units for controlling vehicle behavior and determining a moving direction in which the vehicle behavior is restrained, the vehicle control units including a vehicle stability assist electronic control unit that determines a rotational direction of a steering wheel of a vehicle; and
an integrated control unit which outputs a request to the plurality of vehicle control units, integrally controls the plurality of vehicle control units, and determines the moving direction in which the vehicle behavior is controlled, the integrated control unit being adapted to request that the vehicle stability assist electronic control unit generates a clockwise yaw moment and a counter-clockwise yaw moment of the vehicle,
the plurality of vehicle control units controlling the vehicle behavior based on their own requests and the request from the integrated control unit, wherein
during an understeer state of the vehicle if the integrated control unit sends the request to at least one of the plurality of vehicle control units to control the vehicle behavior in a moving direction that further increases understeer when the at least one of the plurality of the vehicle control units recognizes that the vehicle is in the understeer, or during an oversteer state of the vehicle if the integrated control unit sends the request to at least one of the plurality of vehicle control units to generate the counter-clockwise yaw movement and the steering wheel has been rotated in a counter-clockwise direction, or if the moving direction determined by at least one of the plurality of vehicle control units in which the vehicle behavior is restrained is different from the moving direction determined by the integrated control unit in which the vehicle behavior is controlled,
the at least one of the plurality of vehicle control units denies the request from the integrated control unit.

8. The vehicle behavior control apparatus according to claim 7, wherein each vehicle control unit is provided with a request restriction unit that restricts the request of the integrated control unit.

9. The vehicle behavior control apparatus according to claim 7, wherein the plurality of vehicle control units includes a Vehicle Stability Assist system, a Four Wheel Drive ECU, an Electric Power Steering ECU, and a Four Wheel Steering ECU.

10. The vehicle behavior control apparatus according to claim 7, wherein during the oversteer state of the vehicle, when the steering wheel has been rotated in a clockwise direction and the integrated control unit has requested that the vehicle stability assist electronic control unit generate the clockwise yaw movement, the request of the integrated control unit is denied.

11. The vehicle behavior control apparatus according to claim 7, wherein during the oversteer state of the vehicle, when the steering wheel has been rotated in a clockwise direction and the integrated control unit has requested that the vehicle stability assist electronic control unit generate the counter-clockwise yaw movement, the request of the integrated control unit is allowed.

12. The vehicle behavior control apparatus according to claim 7, wherein during the oversteer state of the vehicle, when the steering wheel has been rotated in a counter-clockwise direction and the integrated control unit has requested that the vehicle stability assist electronic control unit generate the clockwise yaw movement, the request of the integrated control unit is allowed.

* * * * *